United States Patent
Beckwith et al.

[11] Patent Number: 5,867,270
[45] Date of Patent: Feb. 2, 1999

[54] MECHANISM AND METHOD FOR MOUNTING PIEZOELECTRIC TRANSDUCERS

[75] Inventors: Timothy A. Beckwith, Coon Rapids; William M. Brintz, Lino Lakes; Karl D. Johnson, St. Paul, all of Minn.

[73] Assignee: Honeywell Inc., Minneapolis, Minn.

[21] Appl. No.: 984,918

[22] Filed: Dec. 4, 1997

[51] Int. Cl.⁶ .................................................. G01C 19/70
[52] U.S. Cl. ......................................... 356/350; 310/348
[58] Field of Search ............................... 356/350; 372/94; 310/311, 348

[56] References Cited

U.S. PATENT DOCUMENTS

| | | |
|---|---|---|
| 4,314,174 | 2/1982 | Wing et al. . |
| 4,349,183 | 9/1982 | Wirt et al. . |
| 4,370,583 | 1/1983 | Ljung . |
| 4,436,423 | 3/1984 | Kumar et al. ............................ 356/350 |
| 4,740,084 | 4/1988 | Curby et al. . |
| 4,801,206 | 1/1989 | Benoist . |
| 4,847,855 | 7/1989 | Derry et al. ............................. 356/350 |
| 4,988,908 | 1/1991 | Langton . |
| 5,063,321 | 11/1991 | Carter ..................................... 356/350 |
| 5,108,180 | 4/1992 | Simms et al. . |
| 5,308,575 | 5/1994 | Ford . |

Primary Examiner—Samuel A. Turner
Attorney, Agent, or Firm—Albert K. Kau; Thomas A. Rendos

[57] ABSTRACT

Disclosed is a mounting mechanism and method for accurately securing and uniformly bonding piezoelectric transducers (PZT's) to a dither spring. The dither spring includes a central hub, an outer toroidal rim, a plurality of flexible reeds and a plurality of lobes. The reeds extend between the hub and the rim, and one of the lobes is positioned between each pair of adjacent reeds. A mounting mechanism includes locating channels on the lobes sized to receive mounting inserts that hold the PZT's during assembly. The mounting mechanism accurately positions and provides a uniform bonding force to the PZT's to precisely and firmly secure the PZT's on the dither spring reeds.

19 Claims, 4 Drawing Sheets

MECHANISM AND METHOD FOR MOUNTING PIEZOELECTRIC TRANSDUCERS

BACKGROUND OF THE INVENTION

This invention relates to inertial instrument sensors. In particular, the present invention is a ring laser gyroscope dither spring having a mounting mechanism and method for accurately securing piezoelectric transducers to the dither spring reeds.

A ring laser gyroscope (RLG) is commonly used to measure the angular rotation of a vehicle, such as an aircraft. Such a gyroscope has two counter-rotating laser light beams which move within a closed loop optical path or "ring" with the aid of successive reflections from multiple mirrors. The closed path is defined by an optical cavity which is interior to a gyroscope frame or "block". In one type of RLG, the block includes planar top and bottom surfaces that are bordered by six planar sides that form a hexagon shaped perimeter. Three planar non-adjacent sides of the block form the mirror mounting surfaces for three mirrors at the corners of the optical path which is triangular in shape.

Operationally, upon rotation of the RLG about its input axis (which is perpendicular to and at the center of the planar top and bottom surfaces of the block), the effective path length of each counter-rotating laser light beam changes and a frequency differential is produced between the beams that is nominally proportional to angular rate. This differential is then measured by signal processing electronics to determine the angular rotation of the vehicle.

Because of backscatter radiation, which is created as the laser light beams are reflected at the mirror surfaces, and other factors, the frequency difference between the counter-rotating laser light beams disappears when the angular velocity of the RLG about its input axis has a value that is below a particular threshold. This phenomenon is called "lock-in", and the range of angular rotation over which lock-in occurs is the "deadband" of the RLG. This phenomenon is undesirable because, at low rotation rates, lock-in produces an indication that no rotation is occurring when in fact, there is low rate angular rotation. Therefore, any inability to accurately measure low angular rotation rates reduces the effectiveness of the RLG in vehicle navigation systems.

There are several known approaches to eliminating the lock-in phenomenon. One such approach involves using a drive motor for mechanically oscillating the RLG about its input axis so that the RLG is constantly sweeping through the deadband and is never locked therein. This mechanical oscillation of the RLG is called dithering.

Dithering is accomplished by mounting gyroscope block on a flexure device known as a "dither spring". The dither spring is generally composed of a central member or hub (which is centered on The RLG input axis) having a plurality of flexible radial members or reeds extending between the hub and a toroidal rim. Each reed has a pair of piezoelectric transducers (PZT's) mounted on opposite sides thereof via an adhesive. The combination of the dither spring and PZT's defines the drive motor for mechanically oscillating the RLG about its input axis.

Voltages are applied to the PZT's such that one PZT on each reed increases in length while the other PZT decreases in length. The effect of these length changes in the PZT's is transmitted to the reeds through the mounting of the PZT's thereon. Increasing the length of one side of each reed while shortening the other side causes the reeds to flex or bend so that each reed experiences a small rotation about the RLG input axis. The voltage is oscillatory so that the reeds are constantly vibrating in phase and the gyroscope block mounted to the toroidal rim rotates about the input axis. The amplitude of the dithering is generally carefully controlled and monitored to minimize the effects of lock-in. Since the dither oscillation angular velocity and displacement can be constantly monitored, they can be excluded from the output signal of the RLG.

To attain proper dither frequency so as to eliminate the effects of lock-in, and to minimize material stress of the dither spring due to the high frequency flexing of the reeds, the PZT's must be precisely mounted with respect to one another on the reeds of the dither spring. The adhesive bond between the PZT's and the dither spring reeds must exhibit high strength and uniformity across the PZT/reed interface in order to withstand the high mechanical stresses generated between the PZT's and dither spring during dithering. Presently, positioning of the PZT's on the dither spring reeds is accomplished by a person using a combination of sighting by eye and assembly tooling to achieve precise placement and bonding of the PZT's. However, since PZT positioning accuracy and bonding uniformity is largely dependent upon the skill of the person doing the assembling, precise placement and consistent uniform bonding of the PZT's on the dither spring reeds is not always achieved. If the accuracy of the PZT placement is not within acceptable parameters, and/or the adhesive bond across the PZT/reed interface not uniform, RLG performance is compromised and the dither spring and RLG must be rebuilt or scrapped. This increases the manufacturing cost of the dither spring as well as the RLG.

There is a need for an improved mounting mechanism and method for accurately securing and uniformly bonding the PZT's to the reeds of a dither spring of a RLG. In particular, there is a need for a PZT mounting mechanism and method that enables a person assembling the PZT's to the dither spring to consistently, precisely position and uniformly bond the PZT's on the dither spring reeds. In addition, the mounting mechanism and method should improve the consistency of PZT placement and the uniformity of the PZT/reed adhesive bond interface so as to reduce the number of dither springs needing to be rebuilt or scrapped. Lastly, the PZT mounting mechanism and method should be relatively easy and inexpensive to practice and should greatly facilitate automation of assembly.

SUMMARY OF THE INVENTION

The present invention is a mounting mechanism and method for accurately securing transducer devices to a dither spring drive motor for dithering a ring laser gyroscope. The dither spring includes a central hub, an outer toroidal rim and a plurality of flexible reeds extending between the hub and the rim. The flexibility of the reeds allows the rim to rotate relative to the hub. The dither spring further includes a plurality of lobes, with one of the plurality of lobes positioned between each pair of adjacent reeds. A mounting mechanism on the lobes accurately positions and uniformly secures the plurality of transducer devices on the plurality of reeds. The transducer devices, in response to a control voltage, flex the reeds so as to oscillate the rim for dithering the ring laser gyroscope. The method of mounting the transducer devices to the dither spring reeds entails providing the lobes with the mounting mechanism. The transducer devices are then accurately mounted and uniformly secured to the reeds using the mounting mechanism.

This transducer device mounting mechanism and method allows a person assembling the transducer devices to the dither spring to consistently, precisely position the transducer devices on the dither spring reeds, because the mounting mechanism on the lobes acts as a locating feature. In addition, this transducer device mounting mechanism and method allows the person assembling the transducer devices to the dither spring to consistently, uniformly bond the transducer devices to the reeds, because the mounting mechanism applies firm and uniform bond pressure at the PZT/reed interface during assembly. By improving the consistency and uniformity of transducer device placement and bonding, this transducer device mounting mechanism and method reduces the number of dither springs needing to be rebuilt or scrapped. In addition, this transducer device mounting mechanism and method is relatively easy and inexpensive to practice and greatly facilitates automation of assembly operations.

DETAILED DESCRIPTION OF THE PREFERRED EMBODIMENT

Figure 1:
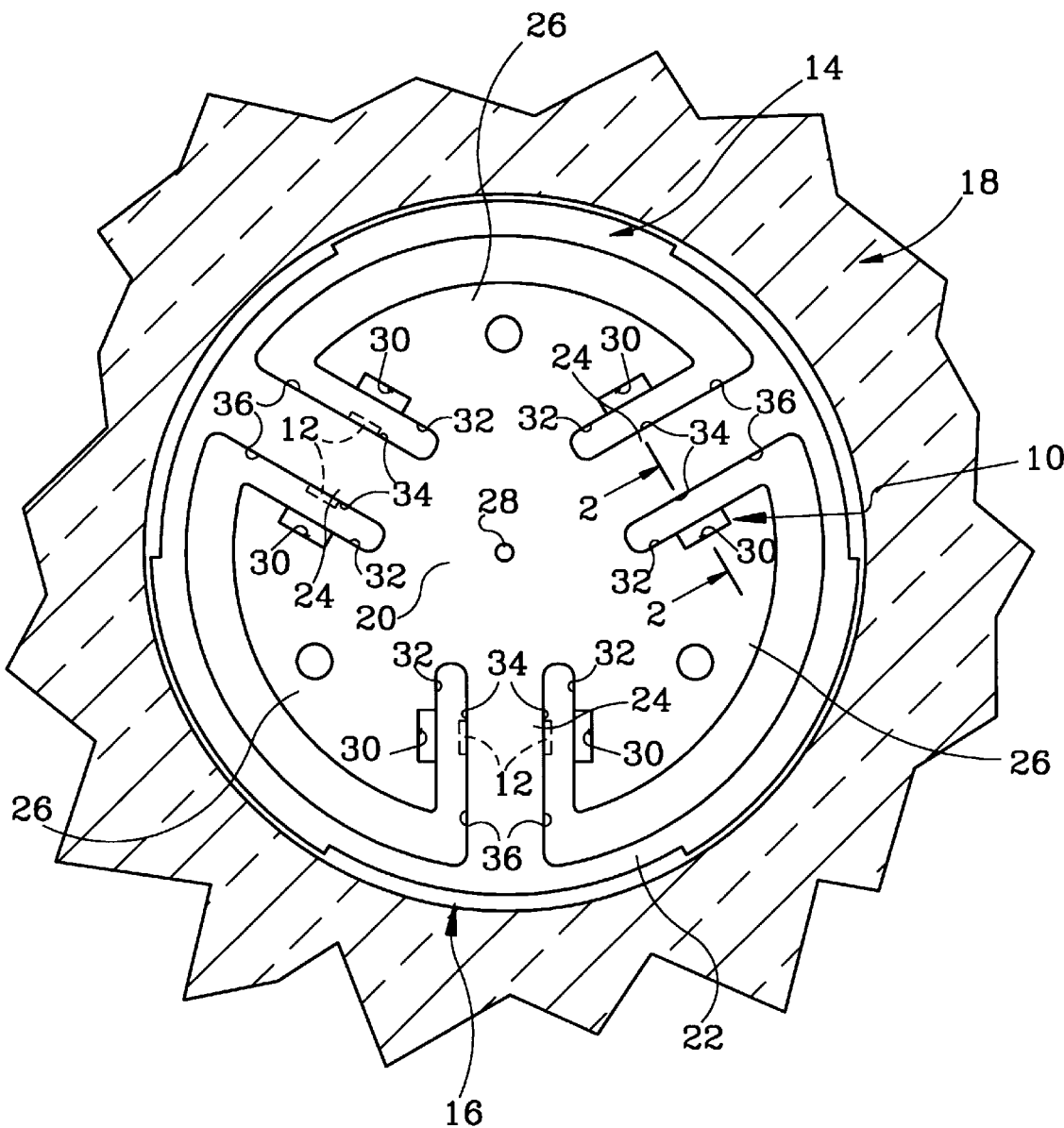
FIG. 1 is an elevational view of a dither spring incorporating the mounting mechanism and method for accurately securing and uniformly bonding piezoelectric transducers (PZT's) to dither spring reeds in accordance with the present invention.

A mounting mechanism 10 and method, in accordance with the present invention, for accurately and uniformly securing a plurality of piezoelectric transducers (PZT's) 12 (only a few being shown in phantom in FIG. 1) to a dither spring 14 that defines a drive motor 16 for dithering a ring laser gyroscope (RLG) 18 (only partially shown) is illustrated in FIGS. 1–5. The dither spring 14 of the drive motor 16 includes a central hub 20, an outer toroidal rim 22, three flexible reeds 24, and three triangular shaped lobes 26. The reeds 24 extend radially between the hub 20 and the rim 22. The flexibility of the reeds 24 allows the rim 22 to rotate relative to the hub 20 which is centered on an input axis 28 of the RLG 18. The triangular shaped lobes 26 extend outwardly from the hub 20, and one of the lobes 26 is interposed between each pair of adjacent reeds 24.

Figure 2:
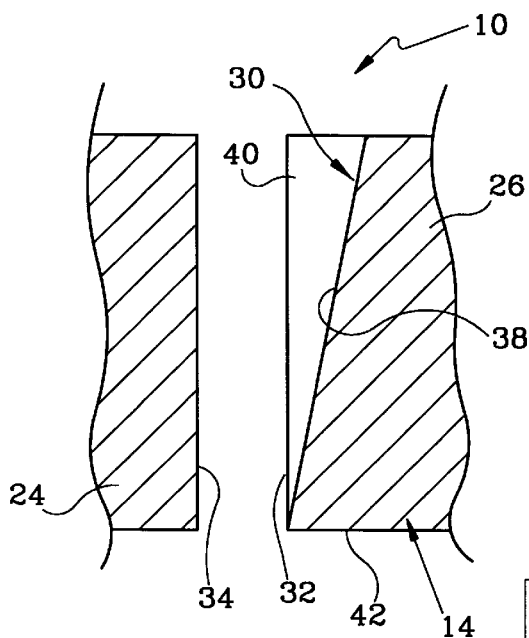
FIG. 2 is an enlarged sectional view taken along line 2—2 in FIG. 1.
Figure 3:
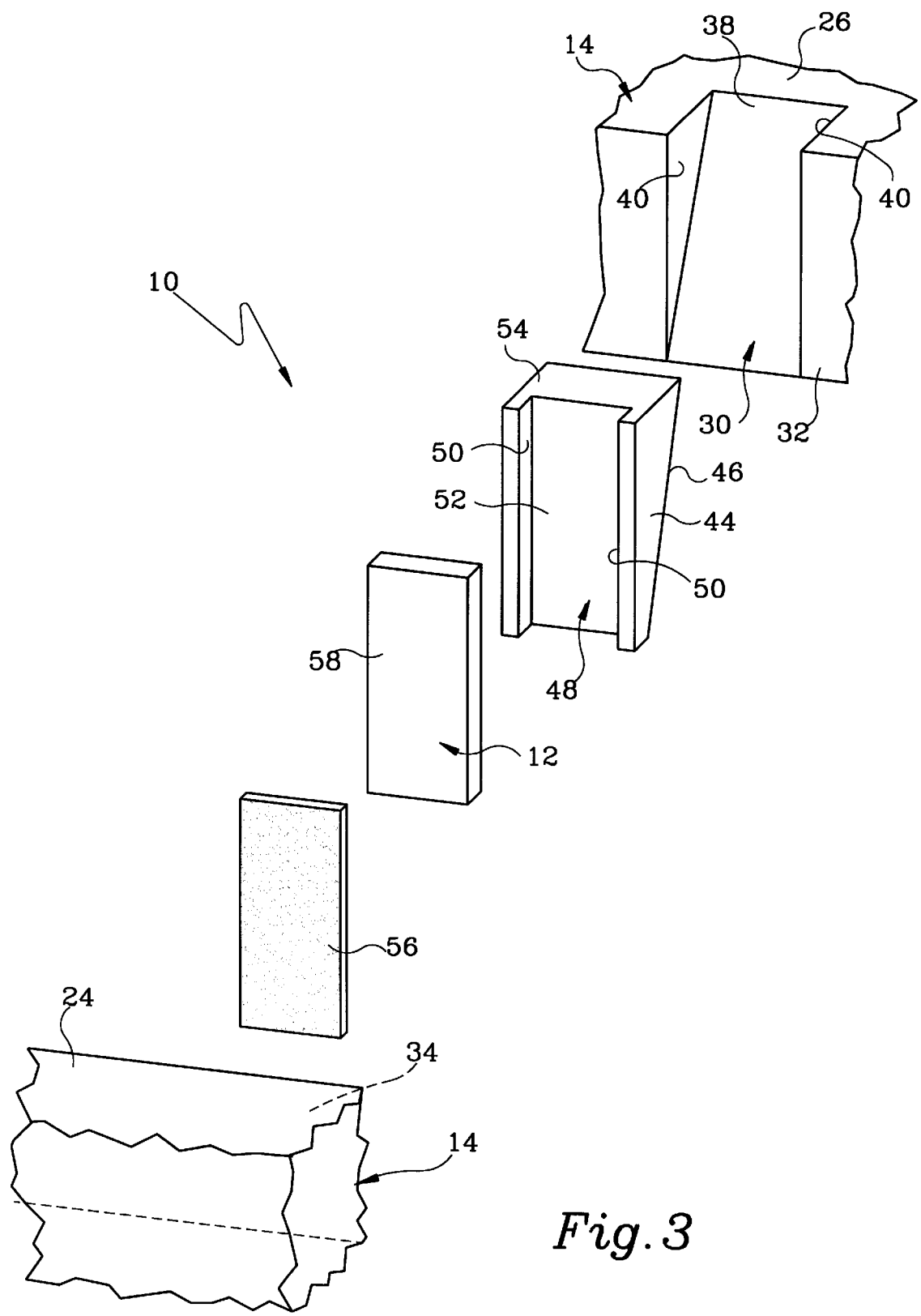
FIG. 3 is an exploded perspective view of components of the PZT mounting mechanism and method.

As seen best in FIGS. 1–3, the mounting mechanism 10, for accurately positioning and uniformly securing the PZT's 12 on the reeds 24, includes locating channels 30 in sidewalls 32 of the lobes 26. The locating channels 30 are located across from mounting surfaces 34, for the PZT's 12, on sidewalls 36 of the reeds 24. As seen best in FIGS. 2 and 3, the locating channels 30 are defined by a pair of spaced, parallel walls 40 with a bottom wall 38 therebetween. Each of the bottom walls 38 forms an acute angle with a lower surface 42 of its respective lobe 26 (see FIG. 2), therefore, the mounting surfaces 34 for the PZT's 12 are not parallel to the bottom walls 38 of the locating channels 30. As seen in FIG. 1, the dither spring 14 has a total of six locating channels 30, with one locating channel 30 being disposed adjacent each sidewall 38 of the reeds 24.

As seen best in FIG. 3, the mounting mechanism 10 further includes wedge shaped mounting inserts 44 sized to be closely received within the locating channels 30. Each of the mounting inserts 44 includes a rear wall 46 and a support channel 48 for holding one of the PZT's 12. The support channel 48 is defined by a pair of spaced, parallel walls 50 with a bottom wall 52 therebetween. Each of the rear walls 46 forms an acute with a top surface 54 of the mounting insert 44. Each of the support channels 48 of the mounting inserts 44 is sized to hold one of the PZT's 12 in an interference fit.

In one preferred embodiment, the dither spring 14 is made of super invar. The dither spring 14 is preferably manufactured using a process known as Electro-Discharge Machining (EDM) which is used to machine the hub 20, rim 22, reeds 24 lobes 26 and locating channels 30 from a super invar material blank. The mounting inserts 44 are made of tool steel and are precision ground to the desired wedge shape.

Figure 4:
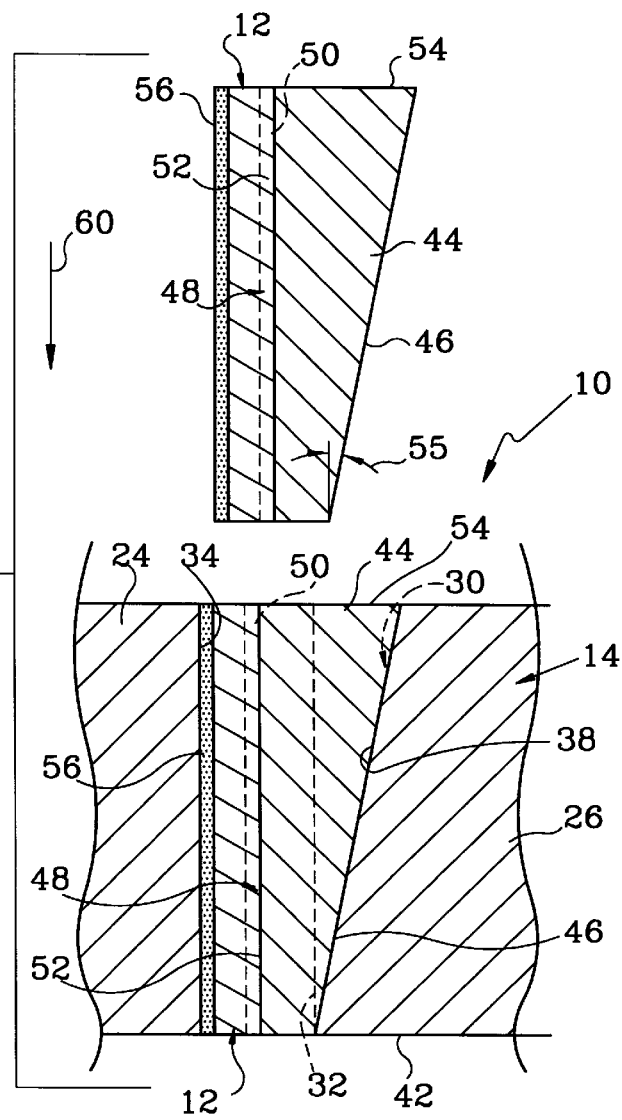
FIG. 4 is an enlarged sectional view similar to FIG. 2 illustrating utilization of the PZT mounting mechanism and method to accurately secure and uniformly bond the PZT's to the dither spring reeds in accordance with the present invention.

The method of accurately positioning the PZT's 12 on the reeds 24 of the dither spring 14 using the mounting mechanism 10 in accordance with the present invention begins with the forming of the mounting inserts 44 and the support channels 48, and the machining of the locating channels 30 into the lobes 26 of the dither spring 14 using the process of EDM. Since EDM is a computer controlled process, the locating channels 30 can be machined with an extremely high degree of precision (see FIG. 2). Next, the PZT's 12 are inserted into the support channels 48 of the mounting inserts 44 (see FIG. 4). The PZT's 12 are held within the support channels 48 via the interference fit provided by the combination of the walls 50 and bottom wall 52 of each of the mounting inserts 44. An electrically conductive adhesive coating 56 is applied to free surfaces 58 of the PZT's 12. As seen in FIG. 4, the mounting inserts 44 with PZT's 12 thereon are then inserted (as represented by arrow 60) into the locating channels 30 of the lobes 26 such that the adhesive coated 56 free surfaces 58 of the PZT's 12 contact the mounting surfaces 34 on the reeds 24. The wedge shape (as defined by the rear walls 46) of the mounting inserts 44 cooperates with the acutely angled bottom walls 38 of the locating channels 30, to insure that the bottom walls 52 of the support channels 48 (and thereby the PZT's 12) are parallel to the mounting surfaces 34 of the reeds 24. Due to the precisely matched angles of the rear walls 46 and the bottom walls 38, a consistent, uniform adhesive bond force is applied to the PZT's 12 at the mounting surfaces 34 (i.e., PZT/reed interfaces) of the reeds 24. The precisely matched angles of the rear walls 46 of the mounting inserts 44 and the bottom walls 38 of the locating channels 30, allows the force generated by driving the wedge surfaces (i.e., the rear walls 46 and the bottom walls 38) together to be evenly distributed along the PZT/reed interfaces at the mounting surfaces 34. The firm bond force is a function of the locking taper concept which is achieved by the small angle 55 (see FIG. 4) of the wedge surfaces (i.e., the rear walls 46) of the mounting inserts 44. This allows a firm force to be generated while locking the wedge surfaces (i.e., the rear walls 46 and the bottom walls 38) in place while the adhesive coating 56 is cured.

Figure 5:
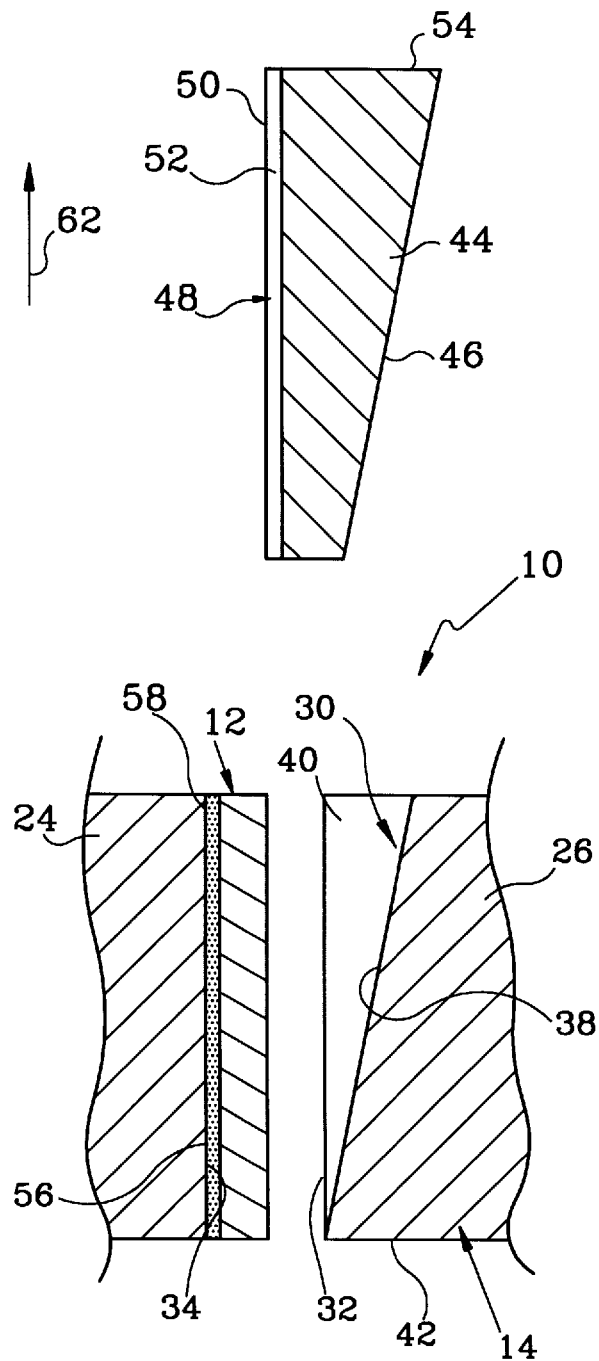
FIG. 5 is an enlarged sectional view similar to FIG. 4 showing the completed assembly of the PZT's to the dither spring reeds.

The adhesive coating 56 is allowed to cure with the mounting inserts 44 in the locating channels 30 to form a firm, high strength, uniform adhesive bond between the PZT's 12 and the dither spring reeds 24 at the mounting surfaces 34. This high strength, uniform adhesive bond is capable of withstanding the high mechanical stresses generated at the mounting surfaces 34 between the PZT's 12 and the dither spring reeds 24 during dithering. As seen in FIG. 5, once the adhesive coating 56 is cured, the mounting inserts 44 are removed (i.e., driven out of the locked configuration as represented by arrow 62), without the PZT's 12 thereon, from the locating channels 30 to complete the precise positioning and uniform bonding of the PZT's on the reeds 24 of the dither spring 14. With the PZT's 12 secured to the dither spring 14, the PZT's 12, in response to a control voltage, will flex the reeds 24 to oscillate the rim 22 to dither the RLG 18.

The PZT mounting mechanism 10 and method allows a person assembling the PZT's 12 to the dither spring 14 to consistently, precisely position the PZT's 12 on the dither spring reeds 24 because the locating channels 30 on the lobes 26 act as a positioning feature. In addition, the PZT mounting mechanism 10 and method allows the person assembling the PZT's 12 to the dither spring 14 to consistently, uniformly bond the PZT's 12 to the reeds 24, because the mounting mechanism 10 applies firm and uniform bond pressure at the PZT/reed interface during assembly. By improving the consistency of PZT placement and PZT bonding uniformity, the PZT mounting mechanism 10 and method reduces the number of dither springs 14 needing to be rebuilt or scrapped. In addition, the PZT mounting mechanism and method is relatively easy and inexpensive to practice and greatly facilitates automation of assembly operations.

Although the present invention has been described with reference to preferred embodiments, workers skilled in the art will recognize that changes may be made in form and detail without departing from the spirit and scope of the invention.

We claim:

1. A drive motor for dithering a ring laser gyroscope, comprising:

a plurality of transducer devices; and
a dither spring, including:
a central hub;
an outer toroidal rim;
a plurality of flexible radial reeds extending between the hub and the rim, the flexibility of the reeds allowing the rim to rotate relative to the hub;
a plurality of lobes on one of the hub and the rim, wherein one of the plurality of lobes is positioned between each pair of adjacent reeds; and
mounting means on the lobes for accurately positioning and uniformly securing the plurality of transducer devices on the plurality of reeds, the transducer devices, in response to a control voltage, flexing the reeds so as to oscillate the rim for dithering a ring laser gyroscope.

2. The drive motor of claim 1 wherein the mounting means includes locating channels on the lobes adjacent to mounting surfaces for the transducer devices on the reeds.

3. The drive motor of claim 2 wherein the mounting means further includes mounting inserts sized to be closely received within the locating channels.

4. The drive motor of claim 3 wherein each of the mounting inserts includes means for supporting one of the transducer devices.

5. The drive motor of claim 4 wherein the supporting means is a support channel sized to receive one of the transducer devices in an interference fit, such that upon insertion of the mounting inserts into the locating channels, the transducer devices contact the mounting surfaces on the reeds with the mounting inserts and locating channels cooperating to apply a uniform bonding force to the transducer devices at the mounting surfaces such that the transducer devices subsequently adhere to the mounting surfaces upon removal of the mounting inserts from the locating channels.

6. The drive motor of claim 5 wherein each of the locating and support channels is defined by a pair of spaced walls with a bottom wall therebetween.

7. The drive motor of claim 6 wherein the bottom walls of the locating channels and the mounting surfaces for the transducer devices on the reeds are non-parallel.

8. The drive motor of claim 7 wherein upon insertion of the mounting inserts into the locating channels, the bottom walls of the support channels and the mounting surfaces for the transducer devices on the reeds are parallel so that the mounting inserts apply the uniform bonding force to the transducer devices at the mounting surfaces.

9. The drive motor of claim 8 wherein the mounting inserts are wedge shaped.

10. The drive motor of claim 1 wherein the plurality of lobes are on the central hub.

11. The drive motor of claim 1 wherein the transducer devices are piezoelectric transducers.

12. A method for mounting transducer devices to a dither spring of the type that includes a central hub, an outer toroidal rim, a plurality of flexible reeds extending between the hub and the rim, and a plurality of lobes positioned between adjacent reeds, the method comprising the steps of:

providing the plurality of lobes with mounting means for accurately positioning and uniformly securing the transducer devices on the plurality of reeds; and
mounting the plurality of transducer devices on the plurality of reeds with accuracy and uniformity using the mounting means.

13. The method of claim 12 wherein the step of providing the plurality of lobes with mounting means includes the step of:

machining locating channels into the lobes adjacent to mounting surfaces for the transducer devices on the reeds.

14. The method of claim 13 wherein the step of providing the plurality of lobes with mounting means further includes the step of:

providing mounting inserts sized to be closely received within the locating channels.

15. The method of claim 14 wherein the step of providing mounting inserts includes the step of:

forming a support channel in each of the mounting inserts sized to receive one of the plurality of transducer devices in an interference fit.

16. The method of claim 15 wherein the step of mounting the plurality of transducer devices on the plurality of reeds includes the step of:

fitting the transducer devices into the support channels of the mounting inserts; and
applying an adhesive coating to free surfaces of the transducer devices.

17. The method of claim 16 wherein the step of mounting the plurality of transducer devices on the plurality of reeds further includes the step of:

inserting the mounting inserts with transducer devices thereon into the locating channels of the lobes such that the adhesive coated free surfaces of the transducer devices contact the mounting surfaces on the reeds, the mounting inserts and locating channels cooperating to apply a uniform bonding force to the transducer devices at the mounting surfaces.

18. The method of claim 17 wherein the step of mounting the plurality of transducer devices on the plurality of reeds further includes the step of:

curing the adhesive to secure the transducer devices to the mounting surfaces of the reeds.

19. The method of claim 18 wherein the step of mounting the plurality of transducer devices on the plurality of reeds further includes the step of:

removing the mounting inserts, without the transducer devices thereon, from the locating channels of the lobes.

\* \* \* \* \*